United States Patent
Horstmyer

Patent Number: 5,098,754
Date of Patent: Mar. 24, 1992

[54] HAY BAG

[76] Inventor: Marilyn Horstmyer, Rte. #3, Box 605 E, Arcadia, Fla. 33821

[21] Appl. No.: 529,384

[22] Filed: May 29, 1990

[51] Int. Cl.⁵ .............................................. B32B 3/00
[52] U.S. Cl. .................... 428/35.2; 383/72; 383/75; 383/107; 383/113; 383/116; 383/117
[58] Field of Search ................... 383/75, 116, 117, 72, 383/107, 113; 428/35.2

[56] References Cited

U.S. PATENT DOCUMENTS

| | | | |
|---|---|---|---|
| 2,863,365 | 12/1958 | Piazze | 385/75 |
| 3,439,865 | 4/1969 | Schwartz | 383/117 |
| 3,660,150 | 5/1972 | Cooper | 383/117 |
| 3,705,835 | 12/1972 | Badrian | 383/116 |
| 4,264,659 | 4/1981 | Pattenden | 383/117 |
| 4,291,082 | 9/1981 | Stall | 383/117 |

Primary Examiner—Patrick J. Ryan
Attorney, Agent, or Firm—Frank A. Lukasik

[57] ABSTRACT

The present invention is a relatively long, rectangular, poly-tarpaulin bag constructed to easily hold a bale of hay approximately 18"×18"×48". The weave of the bag is 12×12 fibers per inch. The bag is made from two panels of material sewn together and closed with a drawstring.

5 Claims, 1 Drawing Sheet

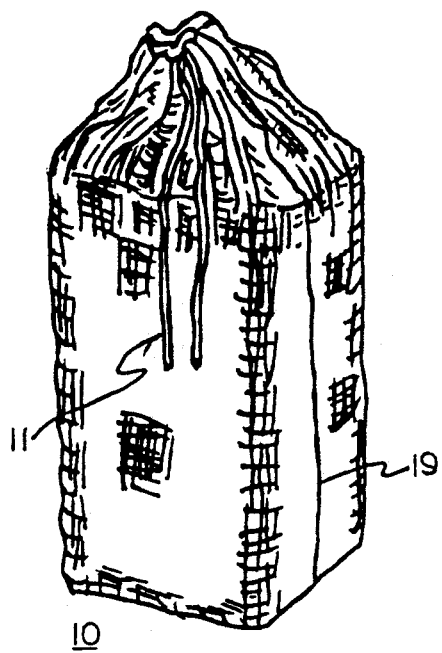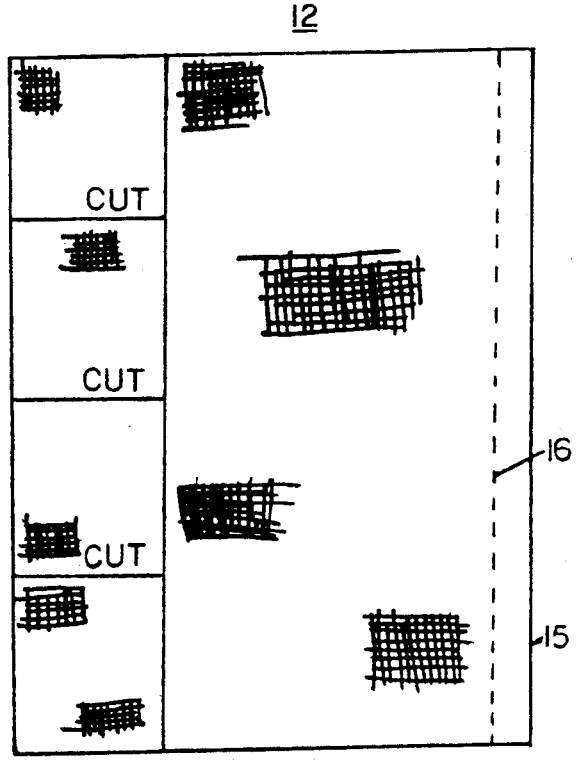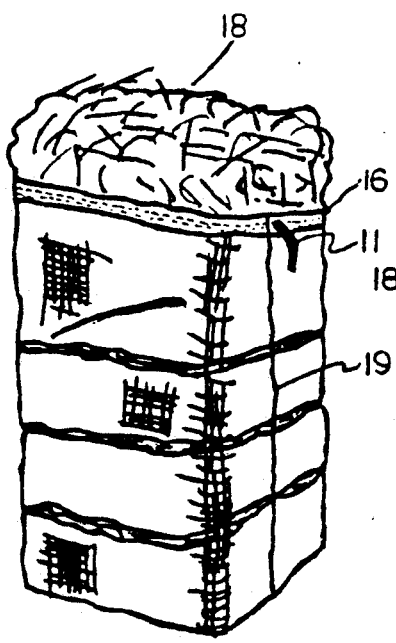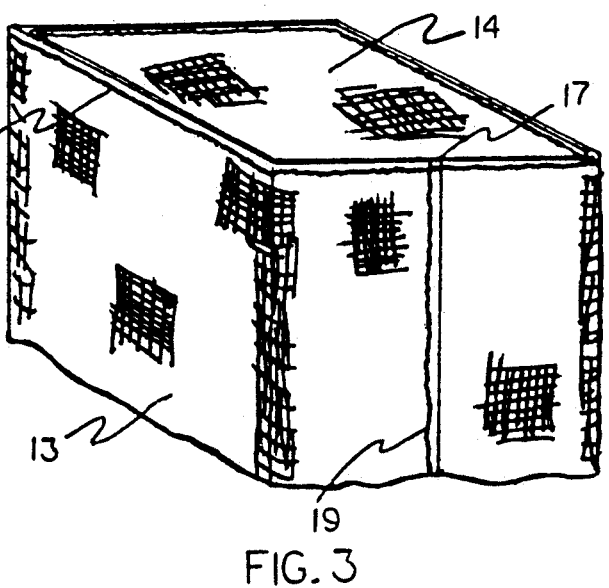
FIG. 1
FIG. 2
FIG. 4
FIG. 3 ns.

HAY BAG

BACKGROUND OF THE INVENTION

1. Field of the invention

This invention relates generally to thermoplastic utility bags and more particularly, to bags fabricated of woven, flat synthetic yarns to produce a light weight, dimensionally stable bag of exceptional strength for heavy duty use as for carrying and dispensing bales of hay.

2. Discussion of the prior art

Thermoplastic shipping bags are an economical means for the packaging, transportation and storage of a wide variety of products in granular, bead, pellet, or powder form. These bags may be either open ended, requiring separate provisions for closing, or fitted with a valved opening. The most commonly used type of thermoplastic bags are manufactured from film made by blown film processes using low density polyethylene and rubber modified high density polyethylene resins and coextruded versions of these resins and allied copolymers. The film may subsequently converted to bags by a variety of sealing techniques. Some of these simple thermoplastic films may be converted to bags by the multiple folding and gluing of the bag ends, but this has the serious disadvantage of requiring very expensive converting equipment, as well as the use of expensive and difficult to control two component glue systems.

Prior art, heat sealed thermoplastic bags are commonly used for the packaging of low cost, non-hazardous products. Their use for higher cost and hazardous products, however, has been badly restricted because of poor puncture and snag resistance of the bags compared with multi-wall paper or woven plastic bags of related composition structures.

Woven plastic bags are shown in U.S. Pat. Nos. 3,439,865 and 3,445,055 to Port et al. The bags are formed by a fabric composed of horizontally-extending flat warp yarns and transversely-extending flat weft or filler yarns. The warp and weft yarns are tightly woven on a textile loom to form a sheet-like material relatively free of interstices. Such yarns may be produced from any suitable synthetic plastic material, including polypropylene, polyamides, such as nylon, polyester or polyacrilic yarns, as well as vinyl and polyethylene. Usable weaves for purposes of their invention lie in the range of 12 ×12 and lower, and in practice a weave of 3×3 is satisfactory. In shaping the fabric into a sack, Port et al cuts a suitable rectangle of the material and folds the same, after which the long end is seamed or heat-sealed to produce a sleeve, and the short end is seamed and possibly reinforced by a marginal fold-over to produce the bottom.

In U.S. Pat. No. 4,576,844, Murray et al disclose a puncture resistant thermoplastic bag of uni-axially oriented polyethylene and inner walls of low density polyethylene, heat-sealed thereto. The film may be subsequently converted to bags by a variety of sealing techniques. Some of these simple thermoplastic films may be converted to bags by sewing but this has the disadvantage of badly weakening the films and introducing unwanted holes in the bag through which moisture or other contaminants can enter or allow environmental contaminants to exit. Other bags may be manufactured by the multiple folding and gluing of the bag ends, but this has serious disadvantage of requiring very expensive converting equipment, as well as the use of expensive and difficult to control two component glue systems. Because of these drawbacks, the use of heat sealing is Murray et al's desired method of manufacture of thermoplastic bags.

I have found however, that properly stitched seams can overcome the disadvantages of the prior art methods of sealing thermoplastic bags. Furthermore, the prior art bags cited above cannot be used for packaging bulky objects such as a bale of hay and any method of heat sealing would be prohibitively expensive. Neither of the patents are concerned with ease of access to the contents of the bags since they are made for a single use and are generally disposable. The bags are formed of a single length of flat material and generally are heat sealed. The patents are generally directed to the construction of the packaging material rather than the assembly for a specific use.

SUMMARY OF THE INVENTION

The present invention is a relatively long, rectangular, Poly-Tarpaulin bag constructed to easily hold a bale of hay approximately 18×18×48 inches. The weave of the bag is 12×12 fibers per square inch. The material must be strong enough to resist punctures from some of the more rigid stalks and must be waterproof. The bag is made from two pieces of material sewn together and closed with a drawstring. Unlike common plastic bags, the invention is designed to be reusable and sufficiently rugged to be carried in a horse van.

Accordingly, it is an object of the present invention to provide a new and improved utility bag.

Another object of the invention is to provide a utility bag which is rugged and long wearing and inexpensive to manufacture.

A still further object of the invention is to provide a water and dust proof bag made of high strength to weight ratio polyester fabric.

Yet another object of the invention is to provide a hay bag made of a rugged, woven, polyethylene fabric laminated with polyethylene film.

These and other objects of the invention will become apparent to those skilled in the art to which the invention pertains when taken in light of the annexed drawings.

BRIEF DESCRIPTION OF THE DRAWINGS

FIG. 1 is a perspective view of a loaded hay bag in accordance with the present invention.

FIG. 2 is a top view of a woven polyethylene blank showing a layout of parts of the invention.

FIG. 3 is a perspective view of the interior of the invention.

FIG. 4 is a perspective view of a partially open, loaded, hay bag in accordance with the invention.

DESCRIPTION OF THE PREFERRED EMBODIMENT

Referring now in more detail to the drawings, FIG. 1 is a perspective view of hay bag 10 loaded with a bale of hay with drawstring 11 drawn to seal the hay bag 10. Parts of the hay bag 10 are cut from a roll of woven polyethylene fabric laminated with polyethylene film shown at 12 in FIG. 2. In a preferred embodiment, POLYTUF (Reg. TM) United Textile and Supply Co. material, or a 12×12 weave "TOO TUFF", 74" wide material, POLY Z, provided by Humphrys, Philadelphia, Pa. was used. Fabric 12 was cut into a body panel 13, approximately 72"×56" and a bottom panel 14 approximately 18⅜"×19". Using a cutout layout as shown in FIG. 2 provides the maximum number of parts with very little scrap. The dimensions shown above, when sewn in accordance with the invention, provides a loose fit for a standard sized bale of hay and are not intended to be a limitation but are merely for example.

Top edge 15 of body panel 13 is folded over to dotted line 16 and stitched along the edge to form a channel 16 for the drawstring 11 when assembled. The fold over is approximately 2½". It has been found that if the channel 16 is too small, the drawstring 11 will be difficult to draw. After the channel 16 is formed, a wire may be inserted to assist in pulling the drawstring 11 through the channel 16.

The hay bag 10 was made by stitching bottom panel 14 to body panel 13 beginning at point 17 along stitch line 18 around the entire periphery of bottom panel 14 and then joining the two ends of body panel 13 and stitching along line 19. In a preferred embodiment, pre-lubricated, bonded nylon thread, Z69, manufactured by Blue mountain Industries was used. The hay bag 10 is then inside out. The bag 10 is then reversed to place the sewn seams inside the bag 10. Although stitching is used in the preferred embodiment, heat sealing or gluing may also be used if so desired. Stitching provides a sufficiently tight seal to make the invention waterproof.

FIG. 4 shows a partially open hay bag 10 with the sides slid downwardly to expose a part of the hay 18 for easy access for feeding livestock. Access to the top (end) of the hay bale provides a convenient means for taking small portions of hay without spillage or waste since the bale is formed in a hay baler in the same manner. Other hay savers on the market contain access openings on the side and access is gained by sliding a zipper. Pulling a portion of hay from the side of the bale is difficult and often results in much waste. Furthermore, hay stalks frequently jam the teeth of the zipper and make it difficult to close. In addition to being less effective to use than the instant invention, it is far more complex and expensive to assemble.

With the hay bag of the instant invention, horse owners as well as other livestock owners will now have a convenient, inexpensive, rugged, waterproof means for carrying a bale of hay whenever they travel between shows and fairs. The hay bag can be easily loaded with a bale of hay and conveniently carried by cinching up the drawstring and carrying the bag over the shoulder.

In addition, there is sufficient room at the top of the hay bag to hold a hay net (feeder) at the top of the bale. Thus, the hay, as well as the feeder, is protected from water, dust and other pollutants in the air as the animals are being transported.

While the invention has been explained with respect to a preferred embodiment thereof, it is contemplated that various changes may be made in the invention without departing from the spirit and scope thereof.

What is claimed is:

1. A water and dust proof hay bag made of a rugged, woven, polyethylene fabric laminated with polyethylene film comprising:
    a body panel having a top edge, a bottom edge and a first end and a second end, said top edge being folded over and joined to said body panel along said edge to form a channel along the entire length of said top edge, and said first end and said second end being joined together to form a water proof seam,
    a bottom panel joined to said bottom edge and forming a water proof, closed end of said bag, and
    a flat drawstring inserted in said channel for closing said body panel top edge when drawn.

2. A bag as set forth in claim 1, wherein said panels are joined by stitching with pre-lubricated bonded nylon thread.

3. A bag as set forth in claim 1, wherein said panels are joined by heat sealing.

4. A bag as set forth in claim 1, wherein said drawstring comprises a nylon ribbon.

5. A water and dust proof hay bag made of a rugged, 12×12 weave, polyethylene fabric laminated with polyethylene film comprising:
    a body panel having a top edge, a bottom edge, and a first end and a second end, said top edge being folded over and stitched with pre-lubricated bonded nylon thread to said body panel along said edge to form a channel along the entire length of said top edge, and said first end and said second end being stitched together with pre-lubricated, bonded nylon thread to form a water proof seam,
    a bottom panel stitched with a pre-lubricated nylon thread to said bottom edge and forming a water proof closed end of said bag, and
    a flat nylon ribbon drawstring inserted in said channel for closing said body panel top edge when drawn.

* * * * *